(12) United States Patent
Miyamoto et al.

(10) Patent No.: US 10,746,287 B2
(45) Date of Patent: Aug. 18, 2020

(54) COOLING STRUCTURE FOR ROTARY ELECTRIC MACHINE

(71) Applicant: TOYOTA JIDOSHA KABUSHIKI KAISHA, Toyota-shi, Aichi-ken (JP)

(72) Inventors: Tomohiko Miyamoto, Nagakute (JP); Keisuke Ito, Toyota (JP); Hiroki Kato, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 62 days.

(21) Appl. No.: 16/138,093

(22) Filed: Sep. 21, 2018

(65) Prior Publication Data

US 2019/0113135 A1 Apr. 18, 2019

(30) Foreign Application Priority Data

Oct. 12, 2017 (JP) ................................ 2017-198777

(51) Int. Cl.
| | |
|---|---|
| *F16H 57/04* | (2010.01) |
| *F16H 61/00* | (2006.01) |
| *H02K 9/19* | (2006.01) |
| *H02K 5/20* | (2006.01) |
| *F16H 59/72* | (2006.01) |

(Continued)

(52) U.S. Cl.
CPC ..... *F16H 61/0028* (2013.01); *F16H 57/0413* (2013.01); *F16H 57/0476* (2013.01); *F16H 59/72* (2013.01); *F25B 45/00* (2013.01); *H02K 5/20* (2013.01); *H02K 9/19* (2013.01); *F01P 11/04* (2013.01); *H02K 1/20* (2013.01); *H02K 9/005* (2013.01)

(58) Field of Classification Search
CPC ............. F16H 61/0028; F16H 57/0476; F16H 57/0413; F25B 45/00; H02K 9/19; H02K 5/20; H02K 9/005; H02K 1/20
See application file for complete search history.

(56) References Cited

U.S. PATENT DOCUMENTS

| 4,845,394 A | 7/1989 | Kleinhans |
| 5,217,085 A * | 6/1993 | Barrie ...................... F01M 1/16 |
| | | 165/297 |

(Continued)

FOREIGN PATENT DOCUMENTS

| EP | 0299908 A1 | 1/1989 |
| JP | 2009-096326 A | 5/2009 |

(Continued)

*Primary Examiner* — Frantz F Jules
*Assistant Examiner* — Lionel Nouketcha
(74) *Attorney, Agent, or Firm* — Oliff PLC (57) ABSTRACT

A cooling structure for a rotary electric machine includes a first supply pipe that is disposed vertically above a rotary electric machine and that has a discharge hole through which a refrigerant is discharged toward the rotary electric machine; a second supply pipe that is disposed in parallel with the first supply pipe vertically above the rotary electric machine and that has a discharge hole through which the refrigerant is discharged toward the rotary electric machine; and a pump configured to deliver the refrigerant to the first supply pipe and the second supply pipe such that a direction of the refrigerant flowing through the first supply pipe and a direction of the refrigerant flowing through the second supply pipe are opposite to each other.

1 Claim, 5 Drawing Sheets (51) Int. Cl.
  *F25B 45/00*  (2006.01)
  *H02K 1/20*   (2006.01)
  *H02K 9/00*   (2006.01)
  *F01P 11/04*  (2006.01)

(56) References Cited

U.S. PATENT DOCUMENTS

| | | | | |
|---|---|---|---|---|
| 5,517,072 | A  * | 5/1996  | Hildebrandt | H01R 39/48 |
| | | | | 310/221 |
| 8,708,855 | B2 * | 4/2014  | Matsushita  | B60K 6/445 |
| | | | | 310/52 |
| 2010/0033040 | A1 * | 2/2010  | Wakita | H02K 9/19 |
| | | | | 310/54 |
| 2010/0264760 | A1 * | 10/2010 | Matsui | H02K 3/24 |
| | | | | 310/54 |

FOREIGN PATENT DOCUMENTS

| | | | |
|---|---|---|---|
| JP | 2011-259634 | A | 12/2011 |
| JP | 2012-191719 | A | 10/2012 |
| JP | 2012191719 | A * | 10/2012 |
| JP | 2017-052387 | A | 3/2017 |
| JP | 2017052387 | A * | 3/2017 |

* cited by examiner

COOLING STRUCTURE FOR ROTARY ELECTRIC MACHINE

INCORPORATION BY REFERENCE

The disclosure of Japanese Patent Application No. 2017-198777 filed on Oct. 12, 2017 including the specification, drawings and abstract is incorporated herein by reference in its entirety.

BACKGROUND

1. Technical Field

The present disclosure relates to a cooling structure that cools a rotary electric machine.

2. Description of Related Art

Electric motor drives that convert electrical energy into rotational kinetic energy, generators that convert rotational kinetic energy into electrical energy, and electric devices that function as both an electric motor drive and a generator are known. In the following, the above-described electric devices are described as rotary electric machines.

A rotary electric machine has two members that are coaxially disposed and rotated relative to each other. Usually, one member is fixed and the other member is rotated. A coil is disposed at the fixed member (stator), and a magnetic field that is rotated by supplying electric power to the coil is formed. The other member (rotor) is rotated due to an interaction with the above-described magnetic field.

Electric vehicles, such as a hybrid vehicle (HV), a plug-in hybrid vehicle (PHV) including a rotary electric machine as a prime mover together with an internal combustion engine, and an electric automobile (EV), are known. As a power unit for the above-described electric vehicles, one having a configuration in which a rotary electric machine is integrated with a transaxle or a transmission has been put to practical use. In the power unit for the electric vehicles, the rotary electric machine is housed within a case, such as the transaxle, and direct cooling with ambient air cannot be expected. Thus, lubricating oil included in the transaxle or the like or a hydraulic fluid for device control is supplied to the rotary electric machine to cool the rotary electric machine.

For example, Japanese Unexamined Patent Application Publication No. 2009-96326 (JP 2009-96326 A) describes that oil is supplied from an oil pump unit constituted of a mechanical oil pump driven by an internal combustion engine and an electric oil pump driven by an electric motor drive to a power transmission mechanism, and lubrication and cooling of individual parts of the power transmission mechanism is performed.

SUMMARY

In addition to high outputs and downsizing of the rotary electric machines, in the rotary electric machines of the electric vehicles including EV and PHV that are under development, the load of the rotary electric machines tends to become high as compared to HV of the related art. For that reason, in the rotary electric machines for the electric vehicles, further improvements in cooling performance are desired.

The present disclosure provides a cooling structure for a rotary electric machine capable of further improving the supply stability of a refrigerant and further improving the cooling performance of the rotary electric machine, and the cooling structure for the rotary electric machine includes a supply pipe of the rotary electric machine that supplies the refrigerant from above.

An aspect of the present disclosure relates to a cooling structure for a rotary electric machine including a first supply pipe, a second supply, and a pump. The first supply pipe is disposed vertically above a rotary electric machine and has a discharge hole through which a refrigerant is discharged toward the rotary electric machine. The second supply pipe is disposed in parallel with the first supply pipe vertically above the rotary electric machine and has a discharge hole through which the refrigerant is discharged toward the rotary electric machine. The pump is configured to deliver the refrigerant to the first supply pipe and the second supply pipe such that a direction of the refrigerant flowing through the first supply pipe and a direction of the refrigerant flowing through the second supply pipe are opposite to each other.

In the cooling structure according to the aspect of the present disclosure, the pump may include a first pump that delivers the refrigerant to the first supply pipe, and a second pump that delivers the refrigerant to the second supply pipe.

In the cooling structure according to the aspect of the present disclosure, the first pump may be a mechanical oil pump; and the second pump may be an electric oil pump.

By virtue of the above-described configuration, in the cooling structure for the rotary electric machine including the supply pipe of the rotary electric machine that supplies the refrigerant from above, the supply stability of the refrigerant can be further improved, and the cooling performance of the rotary electric machine can be further improved.

According to the aspect of the present disclosure, in a case where the flow rate or the pressure of the refrigerant delivered to one of the first supply pipe and the second supply pipe increases, the flow rate or the pressure of the refrigerant delivered to the other can be independently controlled. Accordingly, the discharge range of the refrigerant to the rotary electric machine can be adjusted to a more desirable range from a viewpoint of the cooling performance, and improvements in the cooling performance of the rotary electric machine can be realized.

According to the aspect of the present disclosure, the refrigerant is pumped to one of the first supply pipe and the second supply pipe using the mechanical oil pump, and the refrigerant is pumped to the other using the electric oil pump. As a result, the cooling performance of the rotary electric machine can be further improved by increasing the discharge amount of the refrigerant using the mechanical oil pump, in which the pumping amount of the refrigerant increases or decreases in accordance with load amount under the condition that a high load is applied to the rotary electric machine, for one supply pipe, and the discharge range of the refrigerant to the rotary electric machine can be made optimal from the viewpoint of the cooling performance by appropriately adjusting the discharge direction of the refrigerant using the electric oil pump, which can adjust the pumping amount of the refrigerant without depending on the load amount, for the other supply pipe.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, embodiments related to the present disclosure will be described in detail with reference to the drawings. In the following, a hybrid vehicle on which an internal combustion engine, two rotary electric machines, a mechanical oil pump, an electric oil pump, and the like are mounted will be described as a vehicle. This is merely an example for description.

Figure 1:
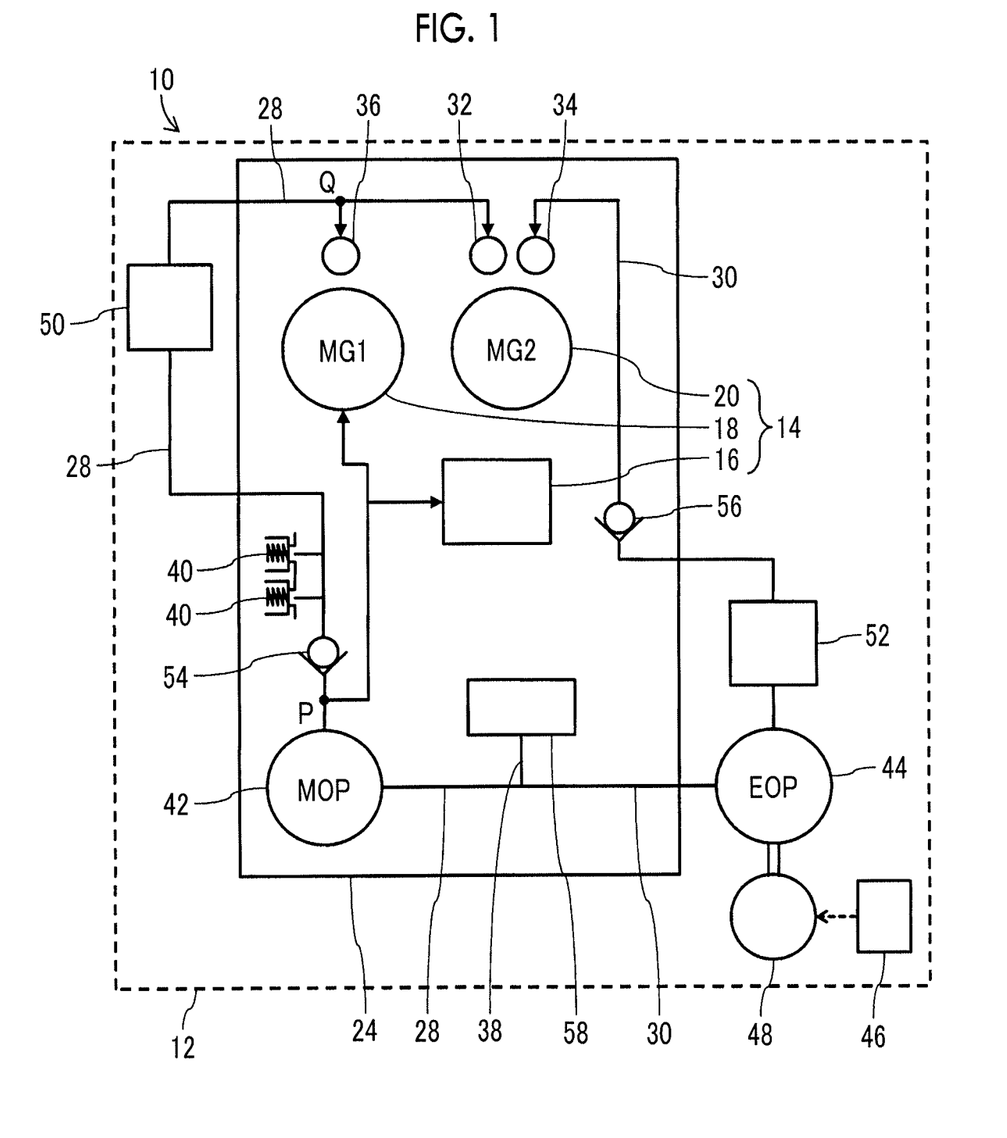
FIG. 1 is a view illustrating the configuration of a vehicle control system in the present embodiment.

FIG. 1 is a view illustrating the configuration of a vehicle control system 10 regarding a hybrid vehicle. The vehicle control system 10 includes a power unit 14 mounted on the hybrid vehicle.

The power unit 14 includes an engine (not illustrated) that is an internal combustion engine, a first rotary electric machine 18 illustrated as MG1, a second rotary electric machine 20 illustrated as MG2, and a power transmission mechanism 16 provided between the first rotary electric machine 18 and the second rotary electric machine 20.

The first rotary electric machine 18 and the second rotary electric machine 20 are motor generators (MG) mounted on the vehicle, and function as motors when electric power is supplied. The first rotary electric machine 18 and the second rotary electric machine 20 are rotary electric machines that are three-phase synchronous type rotary electric machines that function as generators when being braked or driven by the engine. Here, one of the first rotary electric machine 18 and the second rotary electric machine 20 is mainly used as a generator for charge a battery (not illustrated) and the other thereof is mainly used as a drive motor for vehicle running.

For example, the first rotary electric machine 18 is used as a generator that is driven by the engine to generate electric power and supplies the generated electric power to the battery. The second rotary electric machine 20 is used for vehicle running, and receives supply of the electric power from the battery to function as a motor to drive vehicle axles of the vehicle, at the time of powering. The second rotary electric machine 20 can function as a generator to regenerate braking energy to supply the braking energy to the battery, at the time of braking. In the following, a case where the first rotary electric machine 18 is used as the generator and the second rotary electric machine 20 is used as the motor will be described.

The power transmission mechanism 16 is a mechanism that has a function of distributing the power to be supplied to the hybrid vehicle between the output of the engine and the output the first rotary electric machine 18 and the second rotary electric machine 20. As the power transmission mechanism 16 as described above, an output shaft of the engine, output shafts of the first rotary electric machine 18 and the second rotary electric machine 20, and planetary gear mechanisms that are respectively connected to output shafts to the vehicle axles can be used. The output shaft of the engine connects the power transmission mechanism 16 and the engine, is connected to a drive shaft of a mechanical oil pump 42 via a connection shaft, and is used for driving the mechanical oil pump 42.

The charging to a chargeable battery (power source) is performed, for example, by driving the first rotary electric machine 18 with the engine and by supplying the electric power generated by the first rotary electric machine 18. The battery can be constituted of a lithium ion battery pack having a terminal voltage of about 300 V to about 200 V. The battery pack is one in which a plurality of batteries having a terminal voltage of 1 V to several V, which are referred to as single batteries or battery cells, are combined to obtain the above-described predetermined terminal voltage. As the batteries, large-capacity capacitors can be used in addition to secondary batteries, such as the lithium ion battery pack and a nickel hydrogen battery pack.

A case body 24 is a housing that includes the power transmission mechanism 16, the first rotary electric machine 18, and the second rotary electric machine 20 therein, and is also referred to as a transaxle. Oil for performing lubrication of movable parts of the power transmission mechanism 16, the first rotary electric machine 18, and the second rotary electric machine 20 and cooling of the power transmission mechanism 16, the first rotary electric machine 18, and the second rotary electric machine 20 is stored in an internal space of the case body 24. As the oil also having a function of a refrigerant, for example, lubricating oil referred to as an automatic transmission fluid (ATF) can be used.

A cooling system 12 has a first supply passage 28 including the mechanical oil pump 42 and a second supply passage 30 including an electric oil pump 44, as a cooling circuit that circulates and supplies the oil to be used for cooling the first rotary electric machine 18 and the second rotary electric machine 20. The mechanical oil pump 42 and the electric oil pump 44 respectively circulate and supply the oil serving as the refrigerant into the internal space of the case body 24.

The mechanical oil pump 42 and the electric oil pump 44 are configured to suction the oil via a strainer 58 from an oil pan (not illustrated) in which the oil is stored. Specifically, a refrigerant intake passage 38 is connected to the strainer 58 provided on a lower side of the case body 24, and the refrigerant intake passage 38 branches to an electric oil pump 44 side and a mechanical oil pump 42 side downstream of the strainer 58. That is, the mechanical oil pump 42 and the electric oil pump 44 are connected in parallel to the strainer 58.

The first supply passage 28 is configured to include the mechanical oil pump 42, an air-cooling type oil cooler (hereinafter referred to as a "cooler") 50, a first check valve 54, an MG1 supply pipe 36, and a first supply pipe 32.

The mechanical oil pump 42 is a mechanical refrigerant pump in which the drive shaft is connected to the output shaft of the engine, and is driven when the engine operates. That is, when the vehicle runs with engine power, the mechanical oil pump 42 delivers the oil from a delivery port. The oil delivered from the mechanical oil pump 42 while it is supplied to the power transmission mechanism 16 and the first rotary electric machine 18 to function as the lubricating oil, and functions as the refrigerant of the first rotary electric machine 18 and the second rotary electric machine 20 via the first supply passage 28. The mechanical oil pump 42 starts to be driven with the startup of the engine, and ends being driven when the engine stops.

The first check valve 54 is provided between the mechanical oil pump 42 and the cooler 50, and has a function of restraining a backflow of the oil on the delivery port side of the mechanical oil pump 42. The oil delivered by the mechanical oil pump 42 passes through the first check valve 54, and is pumped to the cooler 50.

A branch point P is a position where a flow passage branches to the cooler 50 side and first rotary electric machine 18 side between the mechanical oil pump 42 and the cooler 50. The oil delivered from the mechanical oil pump 42 is supplied to the first rotary electric machine 18 and the power transmission mechanism 16 without passing through the cooler 50 when being pumped to the first rotary electric machine 18 and power transmission mechanism 16 side at the branch point P. On the other hand, the oil pumped to the cooler 50 side at the branch point P flows into the cooler 50.

The cooler 50 is a heat exchanger that performs heat exchange between the oil and air (for example, ambient air of the vehicle), and has cooling performance superior to the water-cooling cooler 52. Since the cooler 50 is provided outside the case body 24, the oil pumped into the first supply passage 28 first flows outside the case body 24, and then returns to the inside of the case body 24 again.

The first supply passage 28 is provided with two relief valves 40 that adjust the hydraulic pressure within the first supply passage 28. Each relief valve 40 has a supply port connected to the first supply passage 28 and has a discharge port opening toward the inside of the case body 24. For example, the relief pressures of the two relief valves 40 are set to different magnitudes. The oil within the first supply passage 28 is configured to be supplied from each relief valve 40 to the inside of the case body 24 at the time of overpressure.

The first supply passage 28 branches to the MG1 supply pipe 36 side that supplies the refrigerant to the first rotary electric machine 18, and the first supply pipe 32 side that supplies the refrigerant to the second rotary electric machine 20, at a branch point Q downstream of the cooler 50. The MG1 supply pipe 36 is a flow passage provided inside the case body 24, is provided above the first rotary electric machine 18, and discharge the refrigerant to the first rotary electric machine 18. The first supply pipe 32 is a flow passage provided inside the case body 24, is provided above the second rotary electric machine 20, and discharge the refrigerant to the second rotary electric machine 20. Accordingly, the oil air-cooled by the cooler 50 is supplied to each of the first rotary electric machine 18 and the second rotary electric machine 20.

The second supply passage 30 is configured to include the electric oil pump 44, a water cooling type oil cooler (hereinafter referred to as a "water-cooling cooler") 52, a second check valve 56, and a second supply pipe 34.

The electric oil pump 44 is an electric refrigerant pump that is driven by an electric motor 48 and is controlled by a control device 46. The control device 46 is constituted of a well-known electronic control device that can control the electric oil pump 44, and controls driving of the electric oil pump 44 by controlling the electric motor 48. The control device 46 can be constituted of a computer suitable for mounting to the hybrid vehicle. The control device 46 may be a portion of another control device to be mounted on the hybrid vehicle, for example, a control device that controls individual elements of the cooling system 12 or an integrated control device that performs control of the overall vehicle.

The water-cooling cooler 52 is a heat exchanger that performs heat exchange between the oil and a coolant. Since the water-cooling cooler 52 is provided outside the case body 24, the oil pumped into the second supply passage 30 first flows outside the case body 24, and then returns to the inside of the case body 24 again.

The second check valve 56 is provided between the water-cooling cooler 52 and the second supply pipe 34, and has a function of restraining a backflow of the oil on the delivery port side of the electric oil pump 44. The oil delivered by the electric oil pump 44 passes through the water-cooling cooler 52 and the second check valve 56, and is pumped to the second supply pipe 34.

The second supply pipe 34 is a flow passage provided inside the case body 24, is provided above the second rotary electric machine 20, and discharge the refrigerant to the second rotary electric machine 20. Accordingly, the oil water-cooled by the water-cooling cooler 52 is supplied to the second rotary electric machine 20.

In order to effectively cool the second rotary electric machine 20, the cooling system 12 related to the present embodiment can pump the oil (refrigerant) cooled by the cooler 50 and the water-cooling cooler 52 having different cooling performances, in different paths, and supply the oil from the first supply pipe 32 and the second supply pipe 34, which are different from each other, to the second rotary electric machine 20. A plurality of cooling paths reaching the second rotary electric machine 20 is formed in the cooling system 12 as described above.

Although both the first supply passage 28 and the second supply passage 30 can be constituted of tubular members, one or both thereof may be flow passages formed by making holes in the case body 24.

Figure 2:
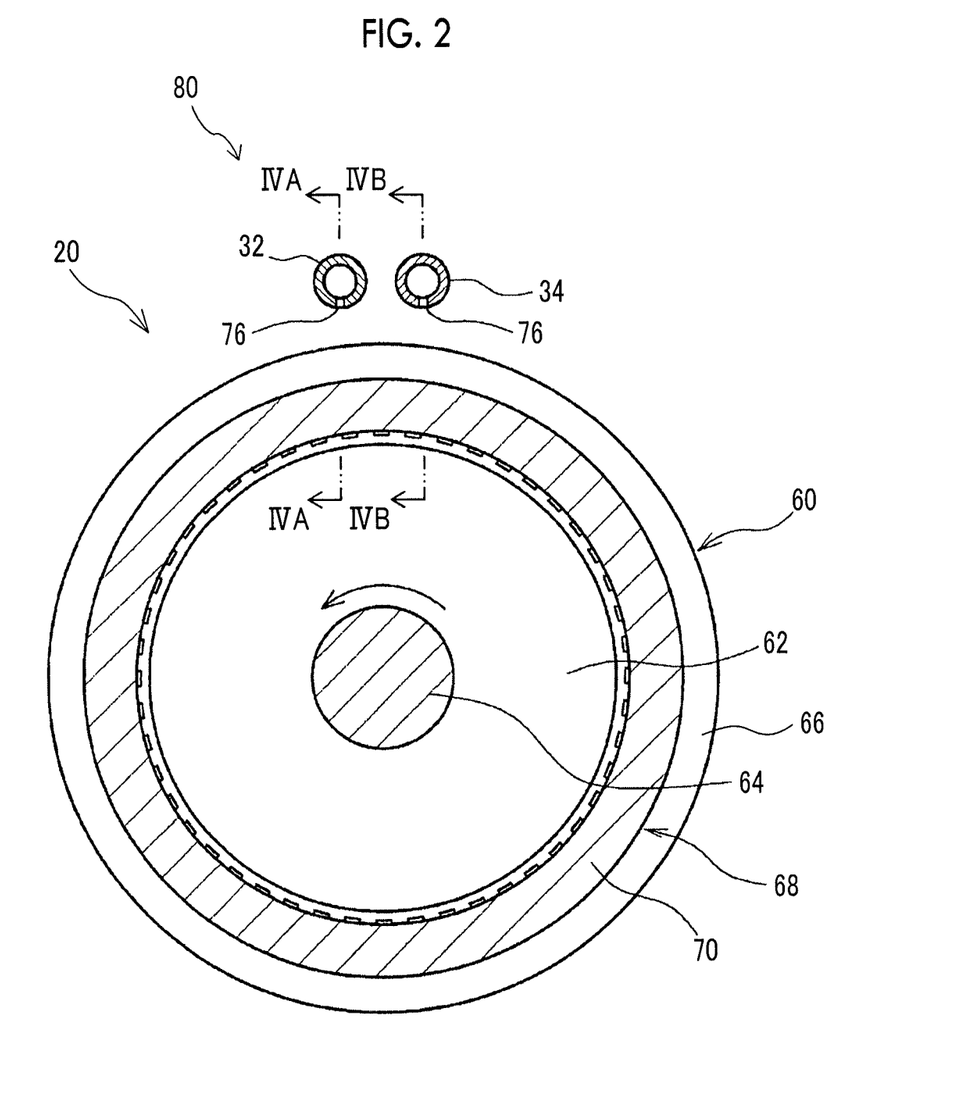
FIG. 2 is a view illustrating the configuration of a rotary electric machine and a cooling structure therefor in the present embodiment.
Figure 3:
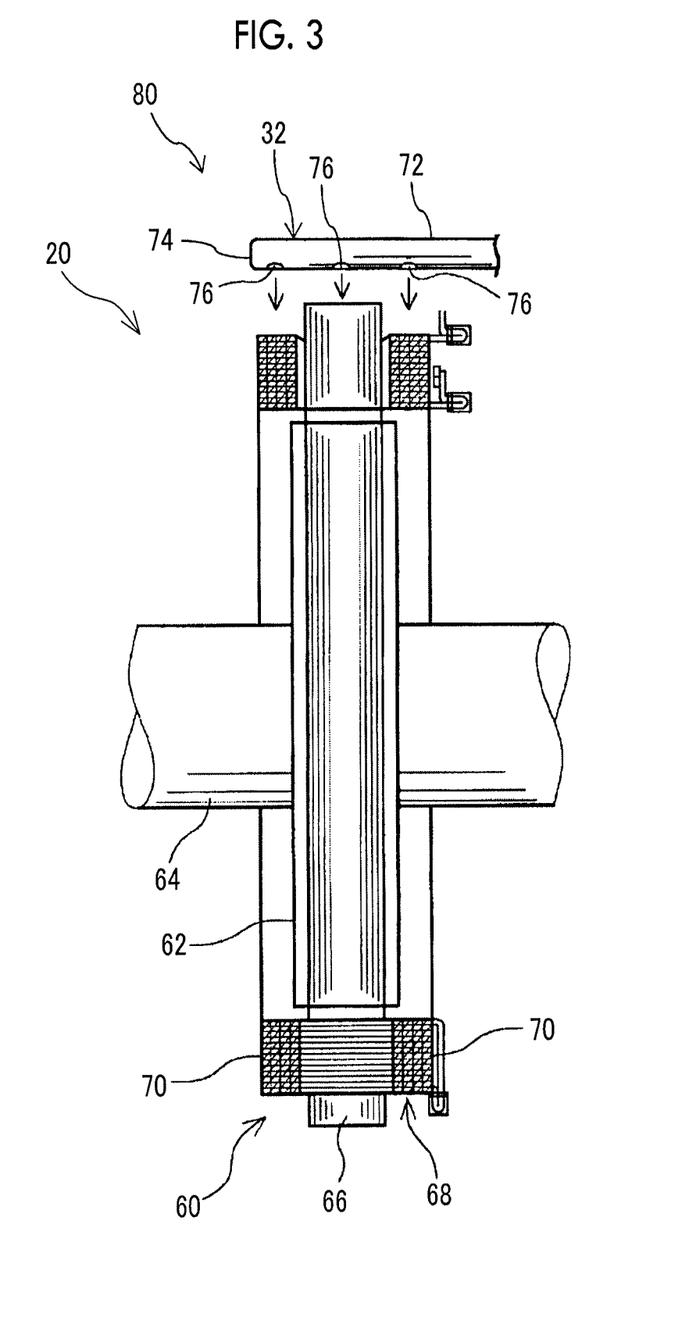
FIG. 3 is a view illustrating the configuration of the rotary electric machine and the cooling structure therefor in the present embodiment.
Figure 4A:
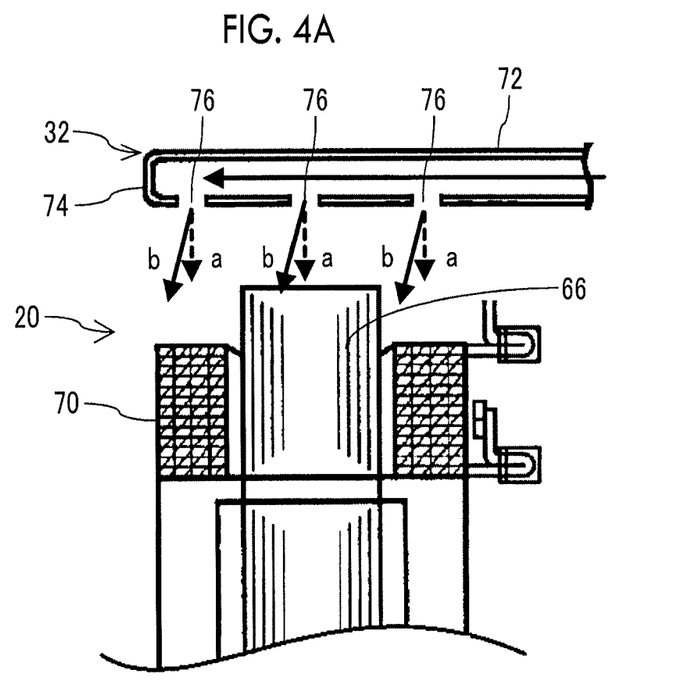
FIG. 4A is a view illustrating a discharge state of a refrigerant by the cooling structure for the rotary electric machine of the present embodiment.
Figure 4B:
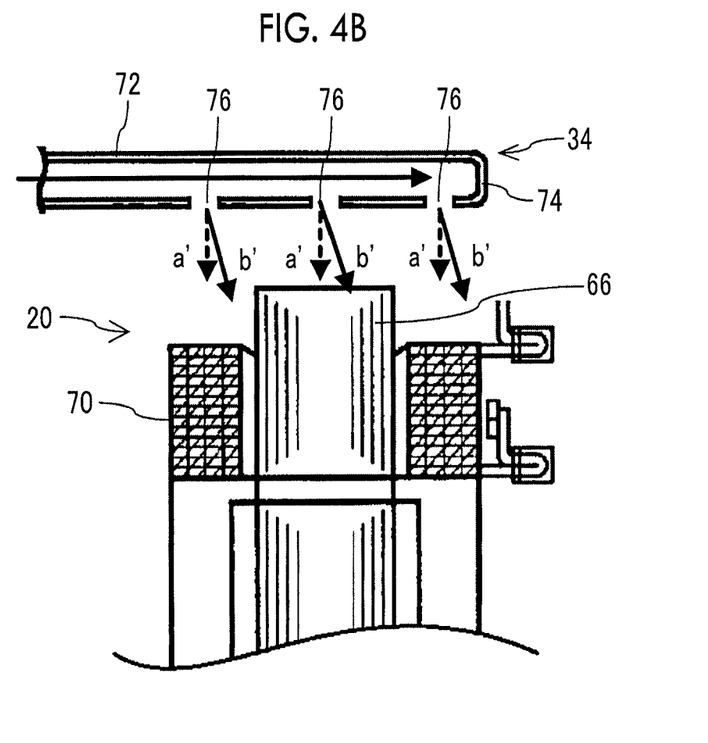
FIG. 4B is a view illustrating a discharge state of the refrigerant by the cooling structure for the rotary electric machine of the present embodiment.

Hereinafter, a structure that cools the second rotary electric machine 20 will be described in detail, referring to the drawings. FIGS. 2 and 3 are views illustrating the configuration of a cooling structure 80 of the second rotary electric machine 20 related to the present embodiment. A cross-section including a rotational axis, especially, a cross-section of a stator is illustrated in FIG. 2, and a section orthogonal to a rotational axis of the second rotary electric machine 20 is illustrated in FIG. 3. FIGS. 4A and 4B are views illustrating a discharge state of the oil by the cooling structure 80, FIG. 4A is a partial sectional view taken along line IVA-IVA illustrated in FIG. 2, and FIG. 4B is a partial sectional view taken along line IVB-IVB illustrated in FIG. 2.

The second rotary electric machine 20 has a cylindrical or annular stator 60, and a columnar or disk-shaped rotor 62 that is disposed coaxially with the cylindrical shape of the stator 60. A rotating shaft 64 passes through the center of the rotor 62. The rotating shaft 64 functions as an output shaft for outputting a rotational force to the outside when the second rotary electric machine 20 operates as an electric motor drive. The rotating shaft 64 functions as an input shaft for inputting a rotational force from the outside when the second rotary electric machine 20 operates as the generator. The second rotary electric machine 20 is used, for example, in a state where the rotating shaft 64 is disposed sideways as illustrated.

The stator 60 includes a stator core 66 in which irregularities are alternately arranged in a circumferential direction at an inner periphery. A coil conducting wire is received in a recessed portion provided at the inner periphery of the stator core 66, and a coil 68 is formed such that the coil conducting wire winds a protruding portion. A rotating magnetic field is formed in a space inside the stator 60 by supplying electric power to the coil 68. In other words, the coil 68 is wound around the stator core 66 such that a rotating magnetic field is formed when electric power is supplied.

The protruding portion of the inner periphery of the stator core 66 is also referred to as teeth and the recessed portion is also referred to as slots. In regions adjacent to end surfaces of the stator core 66, a plurality of coil conducting wires is complicatedly bundled. A portion in which the coil conducting wires are bundled is a coil end 70. In the coil end 70, the coil conducting wires are complicatedly bundled as described above, and a portion having a gap is present between the coil conducting wires. However, the section of the coil end has a rectangular annular shape as a whole, and is located adjacent to a cylindrical end surface of the stator core 66. In FIG. 2, in the coil end 70, bundled individual coil conducting wires are not drawn, and are illustrated in a simplified annular shape.

The rotor 62 has a cylindrical shape as a whole, and is disposed with a slight gap from an inner periphery, especially, teeth tips of the stator 60. In the rotor 62, for example, a permanent magnet is buried near an outer peripheral surface or an outer peripheral surface of the rotor so as to rotate due to the interaction with the rotating magnetic field formed by the stator 60. Portions having different reluctances in the circumferential direction of the rotor 62 can be provided, and the rotor 62 can be rotated due to an interaction between the portions having different reluctances and the rotating magnetic field. The rotating shaft 64 is fixed to the rotor so as to rotate integrally with the rotor 62.

Here, although the heat generated in the coil conducting wires within the slots flows to the surrounding stator core 66, there is no good conductor for heat around the coil end 70. Therefore, temperature tends to rise. For this reason, efficient cooling of the coil end 70 is desired. Generally, since liquid has thermal conductivity better than gas, efficient cooling can be expected in the cooling by the oil. By hanging oil from above and taking heat when the oil flows through the coil end 70, the amount of the oil used can be reduced compared to a case where the coil end 70 is immersed in the oil.

In the cooling structure 80 of the present embodiment, as described above, two systems are provided as the cooling paths that deliver the oil to be used for cooling the second rotary electric machine 20. That is, in the cooling structure 80 of the present embodiment, the second rotary electric machine 20 including the coil end 70 is cooled by supplying the oil from the first supply pipe 32 and the second supply pipe 34 disposed in parallel above the second rotary electric machine 20.

The structure of the first supply pipe 32 and a discharge state of the oil by the first supply pipe 32 are illustrated in FIG. 4A. The first supply pipe 32 is disposed in parallel with the rotating shaft 64 above the stator core 66. The first supply pipe 32 has a tubular, for example, cylindrical, side wall 72, and an end wall 74 provided so as to close one end of the tube. A discharge hole 76 is provided in a surface of the side wall 72 that faces the second rotary electric machine 20. In the present embodiment, three discharge holes 76 are provided in a length direction of the first supply pipe 32. Two of the three discharge holes 76 are disposed at positions that face the coil end 70 on the both sides of the stator core 66, and the remaining one thereof is disposed at a position that faces an outer periphery of the stator core 66. Accordingly, as indicated by arrows in FIG. 4A, the oil delivered into the first supply pipe 32 flows through the first supply pipe 32 toward the end wall 74 from an open end (a right side of FIG. 4A) of the tube, and is discharged toward the second rotary electric machine 20 from the individual discharge holes 76.

Figure 5:
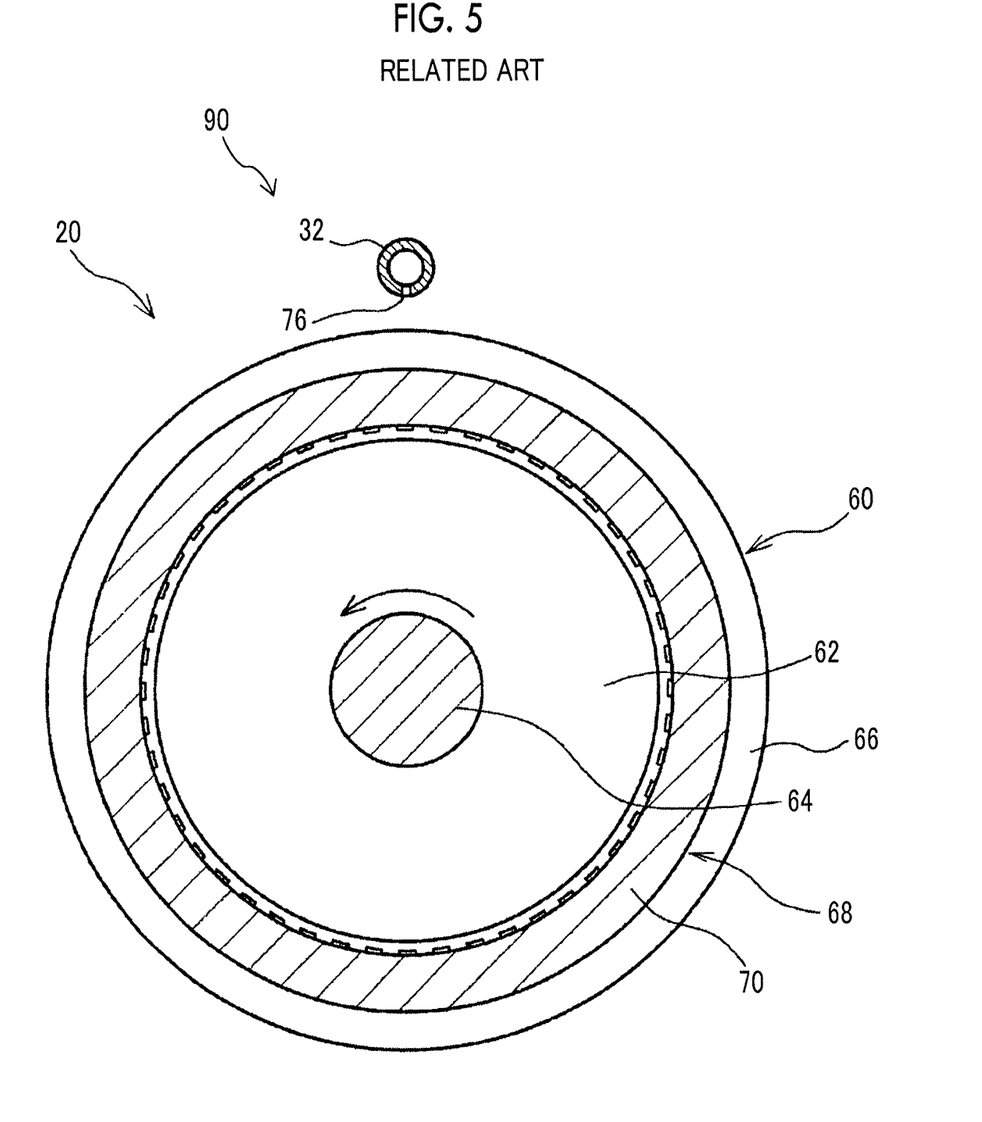
FIG. 5 is a view illustrating the configuration of a rotary electric machine and a cooling structure therefor in the related art.

Here, a cooling structure 90 of the related art illustrated in FIG. 5 will be described. In the cooling structure 90 illustrated in FIG. 5, supply of the refrigerant to the second rotary electric machine 20 is independently performed by the first supply pipe 32 disposed above the second rotary electric machine 20. As described above, the oil pumped by the mechanical oil pump 42 is delivered into the first supply pipe 32, and is discharged from the individual discharge holes 76. The positions of the individual discharge holes 76 are determined, for example, such that oil is discharged to a cooling-desired region, such as the coil end 70 or a region where a cooling effect is relatively high, while taking into consideration a discharge direction of the oil from the discharge holes 76. However, since the drive shaft of the mechanical oil pump 42 is connected to the output shaft of the engine, when the engine operates at high-speed rotation, the flow rate and pressure of the oil to be pumped may increase, and the discharge direction of the oil may deviate in a discharge direction b on the end wall 74 side from a discharge direction a (for example, vertical direction) in FIG. 4A. As a result, in the cooling structure 90 of the related art in which the supply of the refrigerant is independently performed by first supply pipe 32, there is a possibility that the refrigerant is not supplied with an assumed amount or within an assumed range, and the desired cooling performance of the second rotary electric machine 20 is not sufficiently obtained.

The above-described problems are not limited to the mechanical oil pump 42, and may occur even in a case where a refrigerant for cooling a rotary electric machine is pumped to one supply pipe by an electric oil pump in a cooling structure that supplies the refrigerant by the one supply pipe. For example, in a case where the output of the rotary electric machine increases or in a case where the temperature of the rotary electric machine rises, a control device of the electric oil pump may increase the flow rate of the oil pumped from the electric oil pump for the purpose of further enhancing the cooling performance of the rotary electric machine. As a result, in the example of the cooling structure 90 illustrated in FIG. 5, a possibility that the flow rate and the pressure of the oil flowing through the first supply pipe 32 increase, the deviation of the discharge direction of the oil from the discharge holes 76 with respect to an assumed direction occurs, and desired cooling performance is not sufficiently obtained is considered.

In the cooling structure 80 of the present embodiment, as illustrated in FIG. 2, in addition to the first supply pipe 32, the second supply pipe 34 configured such that the direction of the oil flowing therethrough faces the direction of the oil flowing through the first supply pipe 32 is provided as a supply pipe that supplies the refrigerant for cooling the second rotary electric machine 20.

The structure of the second supply pipe 34 that constitute the cooling structure 80 and the discharge state of the oil is illustrated in FIG. 4B. Although the second supply pipe 34 has the same configuration as the first supply pipe 32, the direction in which the oil flows is a direction that faces the first supply pipe 32. That is, the second supply pipe 34 has a tubular, for example, cylindrical side wall 72, and an end wall 74 provided so as to close one end of the tube. However, the end wall 74 is provided on a side (a right side of FIG. 4B) opposite to the first supply pipe 32 in the length direction. Three discharge holes 76 are provided in the length direction in a surface of the side wall 72 of the second supply pipe 34 that faces the second rotary electric machine 20. Two of the three discharge holes 76 are disposed at positions that face the coil end 70 on the both sides of the stator core 66, and the remaining one thereof is disposed at a position that faces the outer periphery of the stator core 66. Accordingly, as indicated by arrows in FIG. 4B, the oil delivered into the second supply pipe 34 flows through the second supply pipe 34 toward the end wall 74 from an open end (a left side of FIG. 4B) of the tube, and is discharged toward the second rotary electric machine 20 from the individual discharge holes 76.

In the cooling structure 80 of the present embodiment, a case where the flow rate and pressure of the oil, which is pumped by the mechanical oil pump 42 and flows through the first supply pipe 32, increases, and the discharge direction of the oil from the individual discharge holes 76 deviates to the end wall 74 side is considered. In this case, in the cooling structure 80 of the present embodiment, the discharge direction of the oil from the individual discharge holes 76 of the second supply pipe 34 is displaced to the opposite side in accordance with the deviation of the discharge direction of the oil from the individual discharge holes 76 of the first supply pipe 32. For example, by controlling the driving of the electric oil pump 44 with the control device 46 to increase the flow rate and the pressure of the oil flowing the second supply pipe 34, the discharge direction of the oil is changed from a discharge direction a' of the oil illustrated in FIG. 4B to a discharge direction b' on the end wall 74 side. As a result, the deviation of the oil discharge direction in the first supply pipe 32 and the deviation of the oil discharge direction in the second supply pipe 34 can be cancelled off, and the oil can be discharged within a desired range. As described above, in the cooling structure 80 related to the present embodiment, even in a case where the flow rate and the pressure of the oil flowing through the first supply pipe 32 or the second supply pipe 34 increase as compared to the cooling structure 90 using the first supply pipe 32 independently, the oil that cools the second rotary electric machine 20 can be discharged to a region having a relatively high cooling effect or to a region where cooling is desired. As a result, the supply stability of the refrigerant can be further improved, the cooling performance of the second rotary electric machine 20 can be further improved, and improvements in the power performance of the hybrid vehicle can be realized.

As long as the directions of the oil that flows through the supply pipes are the same direction even when the supply pipes for supplying the refrigerant to the rotary electric machines are provided, the discharge direction of the oil from the discharge hole deviates when the flow rate and the pressure of the oil flowing through the supply pipes increase. Accordingly, the above-described problems that the cooling performance is not satisfactory may occur still.

In the cooling structure 80 of the present embodiment, the pumping of the oil to the first supply pipe 32 is performed using the mechanical oil pump 42. On the other hand, the pumping of the oil to the second supply pipe 34 is performed using the electric oil pump 44, and the respective oil pumps are different from each other. When the different oil pumps are used in the individual cooling paths as described above, the flow rate or the pressure of the oil delivered to the other cooling path can be independently controlled in a case where the flow rate or the pressure of the oil delivered to one cooling path increases. Accordingly, the discharge range of the oil to the second rotary electric machine 20 can be adjusted to a more desirable range from a viewpoint of the cooling performance. As a result, improvements in the cooling performance of the second rotary electric machine 20 can be realized.

In the above description, an aspect in which the pumping of the oil to the first supply pipe 32 and the second supply pipe 34 by the oil pumps that are independent from each other are shown. However, the pumping of the oil to the first supply pipe 32 and the second supply pipe 34 may be performed by one oil pump. In a case where the pumping of the oil to the first supply pipe 32 and the second supply pipe 34 is performed by the one oil pump, it is considered that increases in the flow rates or the pressures of the oil in both the supply pipes by the oil pump are almost the same, and the deviations of the discharge directions of the oil from the discharge holes 76 are also almost the same. In the cooling structure 80 of the present embodiment, since the directions of the oil flowing through the first supply pipe 32 and the second supply pipe 34 face each other, the deviation of the discharge range of the oil to the second rotary electric machine 20 is averaged consequently. As a result, as compared to the cooling structure using the first supply pipe 32 independently, improvements in the cooling performance of the second rotary electric machine 20 in a case where the flow rate and the pressure of the oil are increased can be realized.

In the present embodiment, the oil is pumped to one of the first supply pipe 32 and the second supply pipe 34 using the mechanical oil pump 42, and the oil is pumped to the other using the electric oil pump 44. As a result, the cooling performance of the rotary electric machine can be further improved by increasing the discharge amount of the refrigerant to the rotary electric machine with the mechanical oil pump 42 in which the pumping amount of the oil increases in accordance with load amount under the condition that a high load is applied to the rotary electric machine, and the discharge range of the refrigerant to the rotary electric machine can be made optimal from the viewpoint of the cooling performance by appropriately adjusting the discharge direction of the refrigerant pumped from the electric oil pump 44 with the electric oil pump 44 in which the pumping amount of the oil does not depend on the load amount.

In the present embodiment, the oil is pumped to both of the MG1 supply pipe 36 for supplying the oil to the first rotary electric machine 18 used as the generator and the first supply pipe 32 for supplying the oil to the second rotary electric machine 20 used as the motor by the mechanical oil pump 42. The first rotary electric machine 18 can supply the oil for cooling the first rotary electric machine 18 with an amount according to the load amount of the first rotary electric machine 18 by supplying the oil to the MG1 supply pipe 36 with the mechanical oil pump 42 in which the pumping amount of the refrigerant increases and the temperature also rises, in accordance with the driving of the engine, and similarly, the load amount increases in accordance with the driving of the engine.

In the present embodiment, the first supply passage 28 that supplies the refrigerant to the first supply pipe 32 includes the cooler 50, and the refrigerant to be delivered to the first supply pipe 32 is cooled by the cooler 50. In the present embodiment, the second supply passage 30 that supplies the refrigerant to the second supply pipe 34 includes the water-cooling cooler 52, and the refrigerant to be delivered to the second supply pipe 34 is cooled by the water-cooling cooler 52. As described above, the refrigerant delivered to one of the first supply pipe and the second supply pipe is cooled by the cooler 50, and the refrigerant delivered to the other is cooled by the water-cooling cooler 52. As a result, it is possible to independently supply the refrigerant cooled by the cooler 50 and the water-cooling cooler 52 having different cooling characteristics, and the cooling needed for the second rotary electric machine 20 can be appropriately carried.

In the present embodiment, a configuration in which the present disclosure is applied to the hybrid vehicle (HV) in which the first rotary electric machine 18 and the second rotary electric machine 20 are provided as prime mover together with the engine has been described. However, the present disclosure may be applied to electric automobiles, such as a plug-in hybrid vehicle (PHV) and an electric vehicle (EV), in which rotary electric machines are provided as the prime movers.

In the present embodiment, a configuration in which one first supply pipe 32 and one second supply pipe 34 are disposed has been described. However, one or both of the first supply pipe 32 and the second supply pipe 34 may be constituted of two or more pipes.

Although the embodiments for carrying out present disclosure have been described above in detail, an applicable embodiment of the present disclosure is not limited to the above-described embodiments, and various alterations or changes can be made within the gist of the present disclosure described in the claims.

What is claimed is:

1. A cooling structure for a rotary electric machine, the cooling structure comprising:
   a first supply pipe that is disposed vertically above the rotary electric machine and that has a discharge hole through which oil is discharged toward the rotary electric machine;
   a second supply pipe that is disposed in parallel with the first supply pipe vertically above the rotary electric machine and that has a discharge hole through which the oil is discharged toward the rotary electric machine;
   a mechanical oil pump configured to deliver the oil to the first supply pipe;
   an electric oil pump configured to deliver the oil to the second supply pipe;
   an electric motor configured to drive the electric oil pump; and
   a control device configured to control the electric motor to control driving of the electric oil pump;
   wherein the cooling structure is configured such that a direction of the oil flowing through the first supply pipe and a direction of the oil flowing through the second supply pipe are opposite to each other; and
   wherein the control device is configured to control driving of the electric oil pump to increase flow rate and pressure of the oil flowing through the second supply pipe responsive to an increase in flow rate and pressure of the oil pumped by the mechanical oil pump through the first supply pipe.

* * * * *